ated States

Kawakami

[11] 3,941,457
[45] Mar. 2, 1976

[54] SYMMETRICAL TYPE FOUR-COMPONENT LENS SYSTEM
[75] Inventor: Tadashi Kawakami, Tokyo, Japan
[73] Assignee: Nippon Kogaku Kabushiki Kaisha, Tokyo, Japan
[22] Filed: Mar. 4, 1974
[21] Appl. No.: 447,678

[30] Foreign Application Priority Data
   Mar. 9, 1973   Japan................................ 48-27109

[52] U.S. Cl............................... 350/220; 350/177
[51] Int. Cl.² ............................................ G02B 9/34
[58] Field of Search ................................... 350/220

[56] References Cited
   UNITED STATES PATENTS
   2,713,809   7/1955   Cook ............................... 350/220 X
   3,672,748   6/1972   Doi et al. ............................ 350/220

Primary Examiner—John K. Corbin
Attorney, Agent, or Firm—Shapiro and Shapiro

[57] ABSTRACT

A symmetrical type four-component lens system comprises, in the direction of incidence of light, a first lens component, a second lens component, a stop, a third lens component and a fourth lens component. Each lens component is a combination of a positive and a negative lens element, the concave surface of each element facing the stop. The surfaces of the first and fourth components facing the stop have shorter radii of curvature than the surfaces of the second and third components facing away from the stop. The first and fourth components have greater focal lengths than the second and third components. The second and third components satisfy certain conditions relating to the materials forming them.

6 Claims, 11 Drawing Figures

—— SAGITTAL RAYS
---- MERIDIONAL RAYS

SYMMETRICAL TYPE FOUR-COMPONENT LENS SYSTEM

BACKGROUND OF THE INVENTION

1. Field of the Invention

This invention relates to a symmetrical type four-component lens system for use as a photographic lens, reproduction lens or the like.

2. Description of the Prior Art

The four-component lenses of the prior art, particularly those which satisfy the conditions that the surface of each lens component facing a stop be concave with respect to the stop, that the surfaces of the first and fourth lens components facing the stop have radii of curvature less than the radii of curvature of the surfaces of the second and third lens components facing away from the stop, and that the first and fourth lens components have focal lengths greater in absolute value than the focal lengths of the second and third lens components, have the limitation that the width of the axial chromatic aberration in equimultiple magnification (1/1) can only be corrected, at best, to a value on the order of 4/1,000 of the total focal length.

SUMMARY OF THE INVENTION

In accordance with the present invention, a symmetrical four-component lens satisfying the above-mentioned conditions has second and third lens components each comprising a combination of a positive lens element and a negative lens element, the width of the axial chromatic aberration of the lens in equimultiple magnification (1/1) being corrected to a value on the order of 4/10,000 of the total focal length by imposing certain conditions upon the materials which form the positive and negative elements.

Description will now be made of how to remove chromatic aberration from a lens for light comprising wavelengths E (green: 546.1m$\mu$), G (blue: 435.8m$\mu$) and C (orange: 656.3m$\mu$). Designating the refractive indices of the lens-forming materials for the wavelengths E, G and C as $n_E$, $n_G$ and $n_C$, respectively, the value $K$ in equation (1) below may conveniently be treated as representing the optical properties of the lens-forming materials.

$$K = \frac{n_E - n_C}{n_G - n_C} \quad (1)$$

If all the lens-forming materials have equal values of $K$ but different dispersive powers, it will be apparent that the chromatic aberration in the lens for light comprising wavelengths E, G and C can be completely removed. In practice, however, the materials generally used for forming lenses have the characteristic that as the dispersive power increases (or as the Abbe number $$\nu = \frac{n_D - 1}{n_F - n_C},$$

which is the reciprocal of the dispersive power, decreases), the value of $K$ decreases. Combinations of materials which have equal values of $K$ but different dispersive powers are rare, and combinations of materials which have greatly different dispersive powers are extremely rare. Therefore, the degree of freedom with respect to the index of refraction of lens-forming materials is limited and, depending on the construction of the lens, correction of aberrations other than chromatic aberration is very difficult to attain.

In accordance with the invention, the chromatic aberration in a lens of the above-described type can be removed substantially completely by forming each of the second and third lens components as a combination of a positive element and a negative element, and by imposing certain conditions upon the materials which form those positive and negative elements.

The invention will become more fully apparent from the following detailed description taken in conjunction with the accompanying drawings.

DESCRIPTION OF THE PREFERRED EMBODIMENTS

Figure 1:
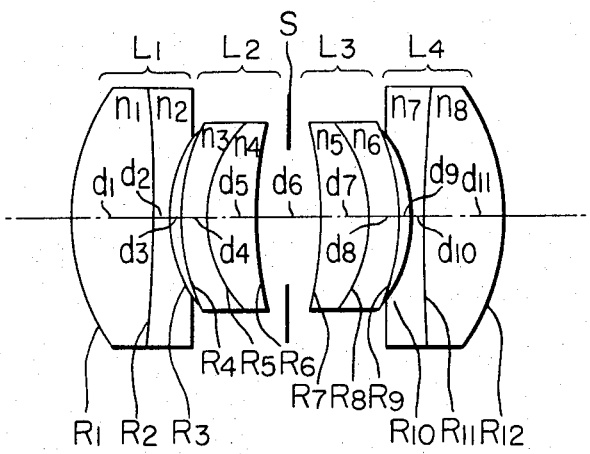
FIG. 1 is a sectional view of a four-component lens system in accordance with the invention.
Figure 2A:
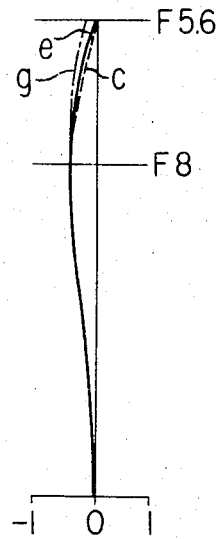
FIGS. 2(A) and 2(B) show the aberration curves of a first embodiment of the invention.
Figure 2B:
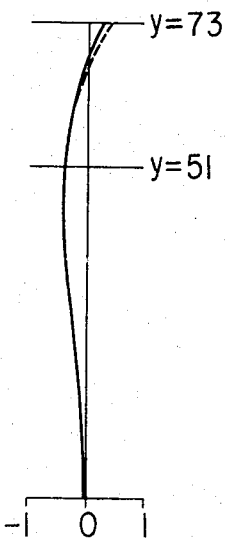
Figure 3A:
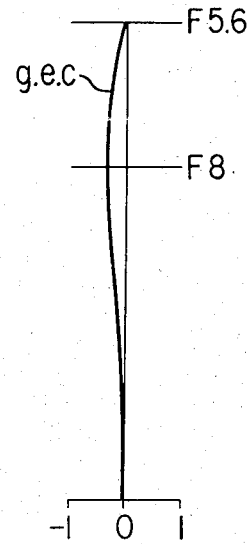
FIGS. 3(A) and 3(B) show the aberration curves of a second embodiment of the invention.
Figure 3B:
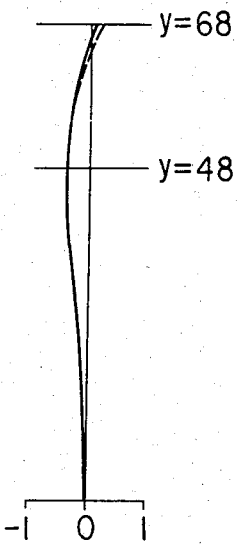

As shown in FIG. 1, a symmetrical type four-component lens in accordance with the present invention comprises, in the direction of incidence of light, a first positive meniscus lens component L1, a second positive meniscus lens component L2, a stop S, a third positive meniscus lens component L3 and a fourth positive meniscus lens component L4, each lens component being a combination of a positive lens element and a negative lens element. In a lens of this type, it is desirable that the indices of refraction of the materials forming the first and fourth lens components L1 and L4 be greater than those of the materials forming the second and third lens components L2 and L3 and that the indices of refraction of the materials forming the negative lens elements be smaller than those of the materials forming the positive lens elements. However, no commercially available glass material provides equal values of $K$ for the positive and negative lens elements forming the first and fourth components L1 and L4 in a lens having a construction which staisfies the foregoing conditions. Designating the values of $K$ for the positive lens elements of the first and fourth components L1 and L4 as $K_{p1}$ and $K_{p4}$, respectively, and the values of $K$ for the negative lens elements of of the same components as $K_{n1}$ and $K_{n4}$, respectively, the relationship of these values is generally expressed by equation (2) below.

$$K_{p1} - K_{n1} > 0 \quad (2)$$

$$K_{p4} - K_{n4} > 0$$

Consequently, if $K_p$ is the sum of the $K$ values in the glass materials forming the positive lens elements of the second and third components L2 and L3, if $\nu_p$ is the sum of the Abbe numbers of these glass materials, if $K_n$ is the sum of the $K$ values in the glass materials forming the negative lens elements of the second and third components L2 and L3, and if $\nu_n$ is the sum of the Abbe numbers of the latter glass materials, then the desired relationship of these values is expressed as follows:

$$K_p - K_n \leq 0 \quad (3)$$

$$\nu_p - \nu_n > 10$$

Thus, in accordance with the invention, a combination of glass materials is selected which will satisfy the two conditions in equation (3) simultaneously. If the conditions expressed by equation (3) were imposed upon only one of the second and third components L2 and L3, there would be provided a lens system having less chromatic aberration than conventional lenses, but having more chromatic aberration than a lens system wherein the conditions of equation (3) are imposed on both lens components.

With regard to the condition of equation (3) that $\nu_p - \nu_n > 10$, it has been found that for $\nu_p - \nu_n < 10$ the refractive powers of the positive and negative lens elements are too great to provide a lens of sufficient F-number.

The invention will be described in more detail referring to the following four examples, wherein $R$ = radius of curvature
$d$ = center thickness of lens and lens spacing
$\nu$ = Abbe number of the glass used.
$n$ = index of refraction of the respective lens elements measured at the designated wavelengths.

Example I
Total focal length f=100, F-number 1:5.6,
Magnification M-1/1 (Perfect Symmetry)

| | | | | | | | |
|---|---|---|---|---|---|---|---|
| $R_1$ = | 23.285 | $d_1$ | = 7.972 | $\nu_1$ = 49.5 | $K_{p1}$ = 0.34551 |
| $R_2$ = | −217.425 | $d_2$ | = 1.812 | $\nu_2$ = 44.3 | $K_{n1}$ = 0.34429 |
| $R_3$ = | 17.394 | $d_3$ | = 1.051 | | |
| $R_4$ = | 26.816 | $d_4$ | = 2.682 | $\nu_3$ = 64.2 | $K_{n2}$ = 0.35599 |
| $R_5$ = | 12.901 | $d_5$ | = 5.001 | $\nu_4$ = 81.5 | $K_{p2}$ = 0.35403 |
| $R_6$ = | 46.384 | $d_6$ | = 6.378 | | |
| $R_7$ = | −46.384 | $d_7$ | = 5.001 | $\nu_5$ = 81.5 | $K_{p3}$ = 0.35403 |
| $R_8$ = | −12.901 | $d_8$ | = 2.682 | $\nu_6$ = 64.2 | $K_{n3}$ = 0.35599 |
| $R_9$ = | −26.816 | $d_9$ | = 1.051 | | |
| $R_{10}$ = | −17.394 | $d_{10}$ | = 1.812 | $\nu_7$ = 44.3 | $K_{n4}$ = 0.34429 |
| $R_{11}$ = | 217.425 | $d_{11}$ | = 7.972 | $\nu_8$ = 49.5 | $K_{p4}$ = 0.34451 |
| $R_{12}$ = | −23.285 | | | | |

$K_p - K_n = -.00392 \qquad \nu_p - \nu_n = 34.6$

Indices of Refraction for Example I

| | | |
|---|---|---|
| $n_{F1}$ = 1.69091 | $n_{G1}$ = 1.70506 | $n_{C1}$ = 1.68344 |
| $n_{F2}$ = 1.61595 | $n_{G2}$ = 1.63012 | $n_{C2}$ = 1.60851 |
| $n_{F3}$ = 1.51871 | $n_{G3}$ = 1.52667 | $n_{C3}$ = 1.51431 |
| $n_{F4}$ = 1.48749 | $n_{G4}$ = 1.49342 | $n_{C4}$ = 1.49424 |
| $n_{F5}$ = 1.48749 | $n_{G5}$ = 1.49342 | $n_{C5}$ = 1.48424 |
| $n_{F6}$ = 1.51871 | $n_{G6}$ = 1.52667 | $n_{C6}$ = 1.51431 |
| $n_{F7}$ = 1.61595 | $n_{G7}$ = 1.63012 | $n_{C7}$ = 1.60851 |
| $n_{F8}$ = 1.69091 | $n_{G8}$ = 1.70506 | $n_{C8}$ = 1.68344 |

Example II
Total focal length 9 100, F-number 1:5.6,
Magnification M=1/1 (Perfect Symmetry)

| | | | | | | |
|---|---|---|---|---|---|---|
| $R_1$ = | 25.425 | $d_1$ = | 13.597 | $\nu_1$ = 58.6 | $K_{p1}$ = 0.35087 |
| $R_2$ = | −224.347 | $d_2$ = | 1.700 | $\nu_2$ = 52.8 | $K_{n1}$ = 0.34991 |
| $R_3$ = | 17.139 | $d_3$ = | 0.986 | | |
| $R_4$ = | 25.514 | $d_4$ = | 2.515 | $\nu_3$ = 67.2 | $K_{n2}$ = 0.35525 |
| $R_5$ = | 11.693 | $d_5$ = | 4.691 | $\nu_4$ = 94.9 | $K_{p2}$ = 0.35328 |
| $R_6$ = | 47.929 | $d_6$ = | 4.936 | | |
| $R_7$ = | −47.929 | $d_7$ = | 4.691 | $\nu_5$ = 94.9 | $K_{p3}$ = 0.35328 |
| $R_8$ = | −11.693 | $d_8$ = | 2.515 | $\nu_6$ = 67.2 | $K_{n3}$ = 0.35525 |
| $R_9$ = | −25.514 | $d_9$ = | 0.986 | | |
| $R_{10}$ = | −17.139 | $d_{10}$ = | 1.700 | $\nu_7$ = 52.8 | $K_{n4}$ = 0.34991 |
| $R_{11}$ = | 224.347 | $d_{11}$ = | 13.597 | $\nu_8$ = 58.6 | $K_{p4}$ = 0.35087 |
| $R_{12}$ = | −25.425 | | | | |

$K_p - K_n = -.00394 \qquad \nu_p - \nu_n = 55.4$

Indices of Refraction for Example II

| | | |
|---|---|---|
| $n_{F1}$ = 1.61521 | $n_{G1}$ = 1.62570 | $n_{C1}$ = 1.60954 |
| $n_{F2}$ = 1.52365 | $n_{G2}$ = 1.53359 | $n_{C2}$ = 1.51830 |
| $n_{F3}$ = 1.44786 | $n_{G3}$ = 1.45443 | $n_{C3}$ = 1.44424 |
| $n_{F4}$ = 1.43497 | $n_{G4}$ = 1.43951 | $n_{C4}$ = 1.43249 |
| $n_{F5}$ = 1.43497 | $n_{G5}$ = 1.43951 | $n_{C5}$ = 1.43249 |
| $n_{F6}$ = 1.44786 | $n_{G6}$ = 1.45443 | $n_{C6}$ = 1.44424 |
| $n_{F7}$ = 1.52365 | $n_{G7}$ = 1.53359 | $n_{C7}$ = 1.51830 |
| $n_{F8}$ = 1.61521 | $n_{G8}$ = 1.62570 | $n_{C8}$ = 1.60954 |

Example III
Total focal length f=100, F-number 1:5.6,
Magnification M=1/2

| | | | | | | |
|---|---|---|---|---|---|---|
| $R_1$ = | 23.105 | $d_1$ | = 7.719 | $\nu_1$ = 49.5 | $K_{p1}$ = 0.34551 |
| $R_2$ = | −219.798 | $d_2$ | = 1.827 | $\nu_2$ = 44.3 | $K_{n1}$ = 0.34429 |
| $R_3$ = | 17.383 | $d_3$ | = 1.061 | | |
| $R_4$ = | 27.478 | $d_4$ | =2.652 | $\nu_3$ = 64.2 | $K_{n2}$ = 0.35599 |
| $R_5$ = | 13.043 | $d_5$ | = 4.496 | $\nu_4$ = 81.5 | $K_{p2}$ = 0.35403 |
| $R_6$ = | 46.285 | $d_6$ | = 6.447 | | |
| $R_7$ = | −47.601 | $d_7$ | = 4.614 | $\nu_5$ = 81.5 | $K_{p3}$ = 0.35403 |
| $R_8$ = | −13.043 | $d_8$ | = 2.711 | $\nu_6$ = 64.2 | $K_{n3}$ = 0.35599 |
| $R_9$ = | −26.728 | $d_9$ | = 1.061 | | |
| $R_{10}$ = | −17.383 | $d_{10}$ | = 1.827 | $\nu_7$ = 44.3 | $K_{n4}$ = 0.34429 |
| $R_{11}$ = | 219.798 | $d_{11}$ | = 7.796 | $\nu_8$ = 49.5 | $K_{p4}$ = 0.34551 |
| $R_{12}$ = | −23.258 | | | | |

$K_p - K_n = -.00392 \qquad \nu_p - \nu_n = 34.6$

Indices of Refraction for Example III

| | | |
|---|---|---|
| $n_{F1}$ = 1.69091 | $n_{G1}$ = 1.70506 | $n_{C1}$ = 1.68344 |
| $n_{F2}$ = 1.61595 | $n_{G2}$ = 1.63012 | $n_{C2}$ = 1.60851 |
| $n_{F3}$ = 1.51871 | $n_{G3}$ = 1.52667 | $n_{C3}$ = 1.51431 |
| $n_{F4}$ = 1.48749 | $n_{G4}$ = 1.49342 | $n_{C4}$ = 1.48424 |
| $n_{F5}$ = 1.48749 | $n_{G5}$ = 1.49342 | $n_{C5}$ = 1.48424 |
| $n_{F6}$ = 1.51871 | $n_{G6}$ = 1.52667 | $n_{C6}$ = 1.51431 |
| $n_{F7}$ = 1.61595 | $n_{G7}$ = 1.63012 | $n_{C7}$ = 1.60851 |
| $n_{F8}$ = 1.69091 | $n_{G8}$ = 1.70506 | $n_{C8}$ = 1.68344 |

Example IV
Total focal length f=100, F-number 1:5.6,
Magnification M=1/2

| | | | | | | |
|---|---|---|---|---|---|---|
| $R_1$ = | 25.434 | $d_1$ = | 13.541 | $\nu_1$ = 58.6 | $K_{p1}$ = 0.35087 |
| $R_2$ = | −224.569 | $d_2$ = | 1.648 | $\nu_2$ = 52.8 | $K_{n1}$ = 0.34991 |
| $R_3$ = | 16.735 | $d_3$ = | 1.001 | | |
| $R_4$ = | 25.775 | $d_4$ = | 2.355 | $\nu_3$ = 67.2 | $K_{n2}$ = 0.35525 |
| $R_5$ = | 12.010 | $d_5$ = | 4.828 | $\nu_4$ = 94.9 | $K_{p2}$ = 0.35328 |
| $R_6$ = | 48.005 | $d_6$ = | 4.945 | | |
| $R_7$ = | −48.954 | $d_7$ = | 5.534 | $\nu_5$ = 94.9 | $K_{p3}$ = 0.35328 |
| $R_8$ = | −11.728 | $d_8$ = | 1.707 | $\nu_6$ = 67.2 | $K_{n3}$ = 0.35525 |
| $R_9$ = | −25.993 | $d_9$ = | 1.001 | | |
| $R_{10}$ = | −17.830 | $d_{10}$ = | 1.707 | $\nu_7$ = 52.8 | $K_{n4}$ = 0.34991 |
| $R_{11}$ = | 227.977 | $d_{11}$ = | 13.423 | $\nu_8$ = 58.6 | $K_{p4}$ = 0.35087 |
| $R_{12}$ = | −25.484 | | | | |

$K_p - K_n = -.00394 \qquad \nu_p - \nu_n = 55.4$

Indices of Refraction for Example IV

| | | |
|---|---|---|
| $n_{F1}$ = 1.61521 | $n_{G1}$ = 1.62570 | $n_{C1}$ = 1.60954 |
| $n_{F2}$ = 1.52365 | $n_{G2}$ = 1.53359 | $n_{C2}$ = 1.51830 |
| $n_{F3}$ = 1.44786 | $n_{G3}$ = 1.45443 | $n_{C3}$ = 1.44424 |
| $n_{F4}$ = 1.43497 | $n_{G4}$ = 1.43951 | $n_{C4}$ = 1.43249 |
| $n_{F5}$ = 1.43497 | $n_{G5}$ = 1.43951 | $n_{C5}$ = 1.43249 |
| $n_{F6}$ = 1.44786 | $n_{G6}$ = 1.45443 | $n_{C6}$ = 1.44424 |
| $n_{F7}$ = 1.52365 | $n_{G7}$ = 1.53359 | $n_{C7}$ = 1.51830 |
| $n_{F8}$ = 1.61521 | $n_{G8}$ = 1.62570 | $n_{C8}$ = 1.60954 |

Figure 4A:
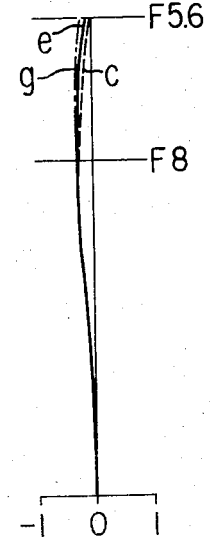
FIGS. 4(A) – 4(C) show the aberration curves of a third embodiment of the invention.
Figure 4B:
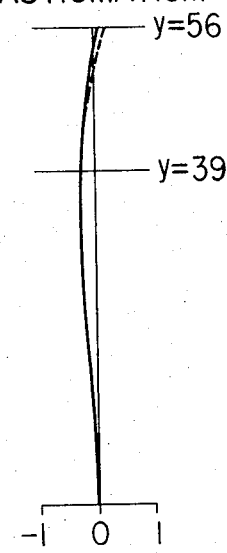
Figure 4C:
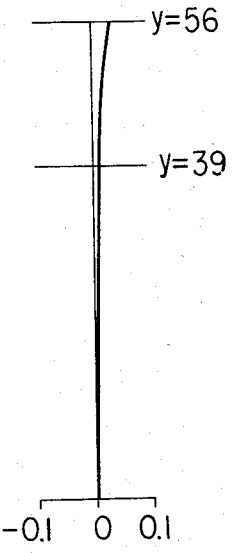
Figure 5A:
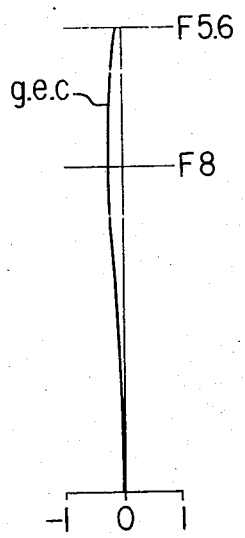
FIGS. 5(A) – 5(C) show the aberration curves of a fourth embodiment of the invention.
Figure 5B:
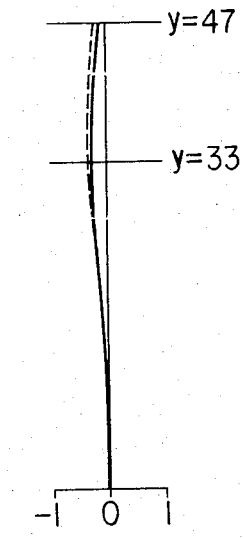
Figure 5C:
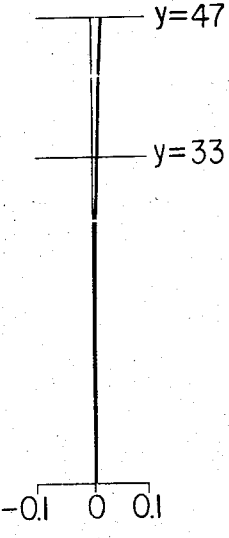

The spherical aberration and astigmatism of the lenses of Examples I and II are shown in FIGS. 2(A) and 2(B) and 3(A) and 3(B), respectively, and the spherical aberration, astigmatism and distortion of the lenses of Examples III and IV are shown in FIGS. 4(A) − 4(C) and 5(A) − 5(C), respectively. It will be apparent that the various aberrations have been well corrected and, more particularly, that the chromatic aberration has been removed to a negligible extent, that is, the width of axial chromatic aberration has been reduced to a value on the order of 4/10,000 of the total focal length.

It is believed that the advantages and improved results furnished by the lens systems of the invention will be apparent from the foregoing description of several preferred embodiments of the invention. Various changes and modifications may be made without departing from the spirit and scope of the invention as sought to be defined in the following claims.

I claim:

1. A symmetrical type four-component lens system comprising, in the direction of incidence of light, a first positive meniscus lens component (L1), a second positive meniscus lens component (L2), a stop (S), a third positive meniscus lens component (L3) and a fourth positive meniscus lens component (L4), each of the lens components being a combination of a positive lens element and a negative lens element, the concave surfaces of each of the lens components facing the stop, the radii of curvature (R3 and R10) of the surfaces of the first and fourth components facing the stop being less than the radii of curvature (R4 and R9) of the surfaces of the second and third components facing away from the stop, the focal lengths of the first and fourth components being greater than the focal lengths of the second and third components, and the second and third components satisfying the following conditions:

$$[K_p - K_n \leq 0]$$
$$[\nu_p - \nu_n > 10]$$

$K_p - K_n$ is in the range of approximately $-0.00392$ to $-0.00394$, and $\nu_p - \nu_n$ is in the range of approximately 34.6 to 55.4, where, if $n_E$, $n_G$ and $n_C$ are the refractive indices of the lens-forming materials for light rays of wavelengths E (546.1mμ), G (435.8mμ) and C (656.3mμ), respectively, and if $K$ is the value represented by $(n_E - n_C)/(n_G - n_C)$, then $K_p$ is the sum of the $K$ values of the materials forming the positive elements in the second and third components, $\nu_p$ is the sum of the Abbe numbers of the materials forming the positive elements in the second and third components, $K_n$ is the sum of the $K$ values of the materials forming the negative elements in the second and third components, and $\nu_n$ is the sum of the Abbe numbers of the materials forming the negative elements in the second and third components.

2. A symmetrical type four-component lens system according to claim 1, wherein the elements of the system referred to in claim 1 have substantially the following values:

```
     ⎡ R₁  =   23.285    d₁ = 7.972    ν₁ = 49.5    K_p1 = 0.34551
L1 —⎨ R₂  = -217.425    d₂ = 1.812    ν₂ = 44.3    K_n1 = 0.34429
     ⎣ R₃  =   17.394    d₃ = 1.051
     ⎡ R₄  =   26.816    d₄ = 2.682    ν₃ = 64.2    K_n2 = 0.35599
L2 —⎨ R₅  =   12.901     d₅ = 5.001    ν₄ = 81.5    K_p2 = 0.35403
     ⎣ R₆  =   46.384    d₆ = 6.378
     ⎡ R₇  =  -46.384    d₇ = 5.001    ν₅ = 81.5    K_p3 = 0.35403
L3 —⎨ R₈  =  -12.901    d₈ = 2.682    ν₆ = 64.2    K_n3 = 0.35599
     ⎣ R₉  =  -26.816    d₉ = 1.051
     ⎡ R₁₀ =  -17.394    d₁₀ = 1.812   ν₇ = 44.3    K_n4 = 0.34429
L4 —⎨ R₁₁ =  217.425    d₁₁ = 7.972   ν₈ = 49.5    K_p4 = 0.34551
     ⎣ R₁₂ =  -23.285
``` where
R denotes radius of curvature
d — the center thickness of the lens and lens spacing, and
ν — the Abbe number of the glass used.

3. A symmetrical type four-component lens system according to claim 1, wherein the elements of the system referred to in claim 1 have substantially the following values:

```
     ⎡ R₁  =   25.425    d₁ = 13.597   ν₁=58.6    K_p1=0.35087
L1 —⎨ R₂  = -224.347    d₂ = 1.700    ν₂=52.8    K_n1=0.34991
     ⎣ R₃  =   17.139    d₃ = 0.986
     ⎡ R₄  =   25.514    d₄ = 2.515    ν₃=67.2    K_n2=0.35525
L2 —⎨ R₅  =   11.693    d₅ = 4.691    ν₄=94.9    K_p2=0.35328
     ⎣ R₆  =   47.929    d₆ = 4.936
     ⎡ R₇  =  -47.929    d₇ = 4.691    ν₅=94.9    K_p3=0.35328
L3 —⎨ R₈  =  -11.693    d₈ = 2.515    ν₆=67.2    K_n3=0.35525
     ⎣ R₉  =  -25.514    d₉ = 0.986
     ⎡ R₁₀ =  -17.139    d₁₀ = 1.700   ν₇=52.8    K_n4=0.34991
L4 —⎨ R₁₁ =  224.347    d₁₁ = 13.597  ν₈=58.6    K_p4=0.35087
     ⎣ R₁₂ =  -25.425
``` where
R denotes radius of curvature,
d — the center thickness of the lens and lens spacing, and
ν — the Abbe number of the glass used.

4. A symmetrical type four-component lens system according to claim 1, wherein the elements of the system referred to in claim 1 have substantially the following values:

```
     ⎡ R₁  =   23.105    d₁ = 7.719    ν₁ = 49.5    K_p1 = 0.34551
L1 —⎨ R₂  = -219.798    d₂ = 1.827    ν₂ = 44.3    K_n1 = 0.34429
     ⎣ R₃  =   17.383    d₃ = 1.061
     ⎡ R₄  =   27.478    d₄ = 2.652    ν₃ = 64.2    K_n2 = 0.35599
L2 —⎨ R₅  =   13.043    d₅ = 4.496    ν₄ = 81.5    K_p2 = 0.35403
     ⎣ R₆  =   46.285    d₆ = 6.447
     ⎡ R₇  =  -47.601    d₇ = 4.614    ν₅ = 81.5    K_p3 = 0.35403
L3 —⎨ R₈  =  -13.043    d₈ = 2.711    ν₆ = 64.2    K_n3 = 0.35599
     ⎣ R₉  =  -26.728    d₉ = 1.061
     ⎡ R₁₀ =  -17.383    d₁₀ = 1.827   ν₇ = 44.3    K_n4 = 0.34429
L4 —⎨ R₁₁ =  219.798    d₁₁ = 7.796   ν₈ = 49.5    K_p4 = 0.34551
     ⎣ R₁₂ =  -23.258
``` where
R denotes radius of curvature,
d — the center thickness of the lens and lens spacing, and
ν — the Abbe number of the glass used.

5. A symmetrical type four-component lens system according to claim 1, wherein the elements of the system referred to in claim 1 have substantially the following values:

```
     ⎡ R₁  =   25.434    d₁ = 13.541   ν₁=58.6    K_p1=0.35087
L1 —⎨ R₂  = -224.569    d₂ = 1.648    ν₂=52.8    K_n1=0.34991
     ⎣ R₃  =   16.735    d₃ = 1.001
     ⎡ R₄  =   25.775    d₄ = 2.355    ν₃=67.2    K_n2=0.35525
L2 —⎨ R₅  =   12.010    d₅ = 4.828    ν₄=94.9    K_p2=0.35328
     ⎣ R₆  =   48.005    d₆ = 4.945
     ⎡ R₇  =  -48.954    d₇ = 5.534    ν₅=94.9    K_p3=0.35328
L3 —⎨ R₈  =  -11.728    d₈ = 1.707    ν₆=67.2    K_n3=0.35525
     ⎣ R₉  =  -25.993    d₉ = 1.001
     ⎡ R₁₀ =  -17.830    d₁₀ = 1.707   ν₇=52.8    K_n4=0.34991
L4 —⎨ R₁₁ =  227.977    d₁₁ = 13.423  ν₈=58.6    K_p4=0.35087
     ⎣ R₁₂ =  -25.484
``` where
R denotes radius of curvature,
d — the center thickness of the lens and lens spacing, and
ν — the Abbe number of the glass used.

6. A symmetrical type four-component lens system comprising in the direction of incidence of light, a first positive meniscus lens component (L1), a secoond positive meniscus lens component (L2), a stop (S), a third positive meniscus lens component (L3) and a fourth positive meniscus lens component (L4), each of the lens components being a combination of a positive and a negative lens element, the concave surfaces of each of the lens components facing the stop, the radii of curvature (R3 and R10) of the surfaces of the first and fourth components facing the stop being less than the radii of curvature (R4 and R9) of the surfaces of the second and third components facing away from the stop, the focal lengths of the first and fourth components being greater than the focal lengths of the second and third components, one component of said second and third components satisfying the following conditions:

$K_p - K_n$ is in the range of approximately $-0.00392$ to $-0.00394$, and $\nu_p - \nu_n$ is in the range of approximately 34.6 to 55.4, where, if $n_E$, $n_G$ and $n_C$ are the refractive indices of the lens-forming materials for light rays of wavelengths E(546.1m$\mu$), G (435.8m$\mu$) and C (656.3m$\mu$), respectively, and if $K$ is the value represented by $(n_E - n_C)/(n_G - n_C)$, then $K_p$ is the $K$ value of the material forming the positive element of said one component, $\nu_p$ is the Abbe number of the material forming the positive element of said one component, $K_n$ is the $K$ value of the material forming the negative element of said one component, and $\nu_n$ is the Abbe number of the material forming the negative element of said one component.

* * * * *

UNITED STATES PATENT AND TRADEMARK OFFICE
CERTIFICATE OF CORRECTION

PATENT NO. : 3,941,457
DATED : March 2, 1976
INVENTOR(S) : Radashi Kawakami

It is certified that error appears in the above-identified patent and that said Letters Patent are hereby corrected as shown below:

Column 7, after line 9, insert:

$$--[K_p - K_n \leq 0]$$

$$[\gamma_p - \gamma_n > 10] --.$$

Signed and Sealed this

Fifth Day of October 1976

[SEAL]

Attest:

RUTH C. MASON
*Attesting Officer*

C. MARSHALL DANN
*Commissioner of Patents and Trademarks*